J. GRAY.
TIRE CHAIN FASTENER.
APPLICATION FILED JUNE 14, 1921.
1,419,043.
Patented June 6, 1922.
2 SHEETS—SHEET 2.
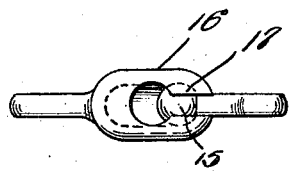
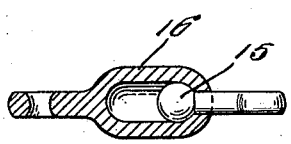
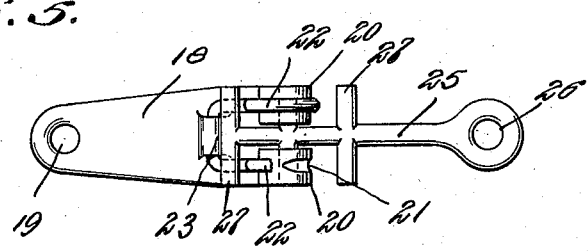
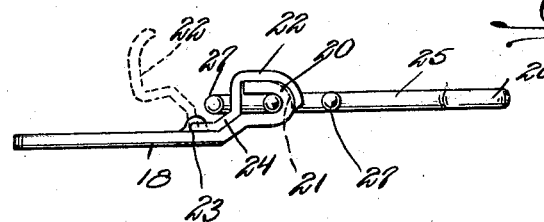
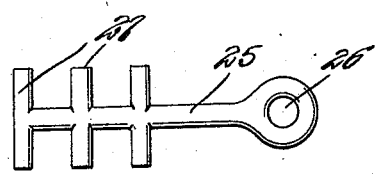
John Gray,
INVENTOR
BY Victor J. Evans.
ATTORNEY

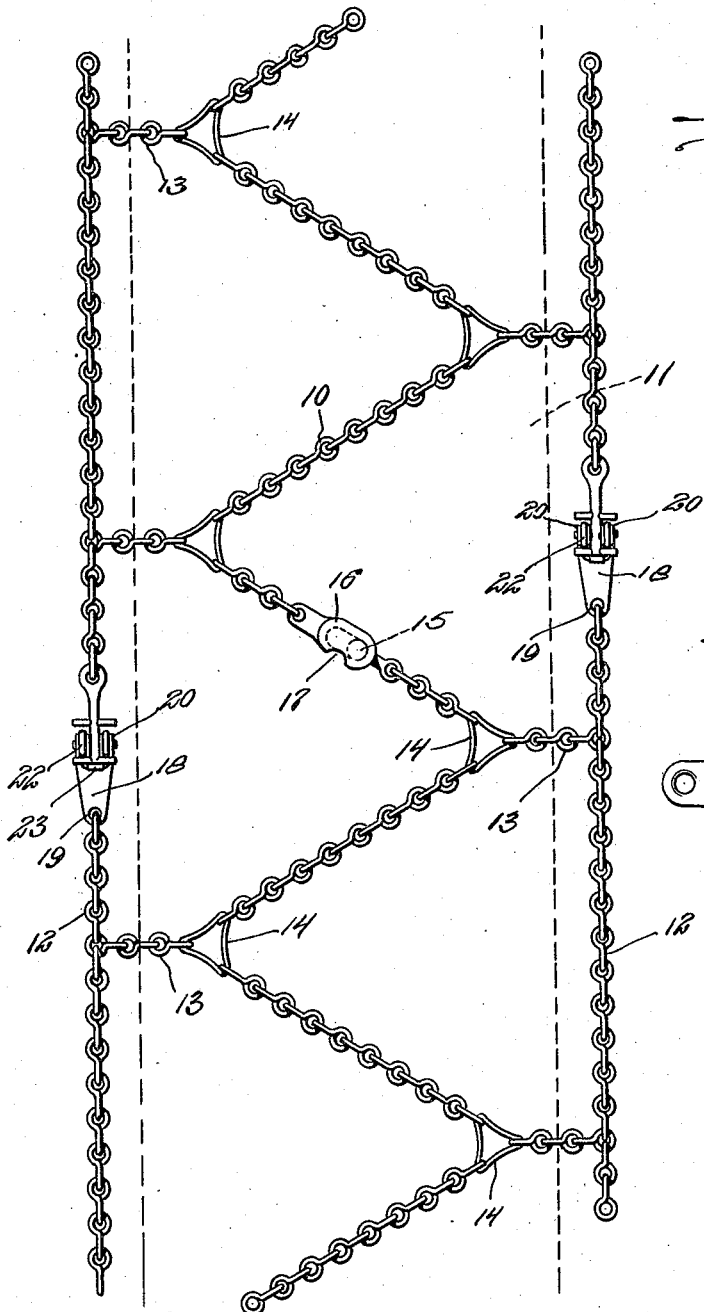

UNITED STATES PATENT OFFICE.

JOHN GRAY, OF ELYRIA, OHIO.

TIRE-CHAIN FASTENER.

1,419,043.

Specification of Letters Patent. Patented June 6, 1922.

Application filed June 14, 1921. Serial No. 477,504.

*To all whom it may concern:*

Be it known that I, JOHN GRAY, a citizen of the United States, residing at Elyria, in the county of Lorain and State of Ohio, have invented new and useful Improvements in Tire-Chain Fasteners, of which the following is a specification.

This invention relates to anti-skid devices for automobile wheels, and has for one of its objects the provision of a chain which is arranged in a zig-zag fashion across the tread of the tire so that the track properties of the wheel is improved, the tread portion of the device being detachably connected to the usual side chains which are arranged at the opposite sides of the wheel.

Another object of the invention resides in the provision of a connecting device for the adjacent ends of each side chain, the connecting device being of novel construction and susceptible of adjustment to vary the length of the side chain, and to connect the ends of the chain to prevent casual separation thereof under any and all conditions.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 1 is a fragmentary plan view of the anti-skid device.

Figure 2 is a plan view, partly in section of one of the connecting devices between certain links of the chain.

Figure 3 is a side elevation of the connection shown in Figure 2.

Figure 4 is a sectional view of the device shown in Figure 3.

Figure 5 is a plan view of the fastening device for connecting the adjacent ends of the side chain.

Figure 6 is a side elevation of the device shown in Figure 5.

Figure 7 is a plan view of the movable bar forming part of the fastening device illustrated in Figure 6.

The anti-skid device forming the subject matter of my invention comprises an endless chain 10 which is arranged in zig-zag fashion across the tread of the tire 11, the chain 10 being connected to the usual side chains 12 which are arranged at the opposite sides of the wheel, short chains 13 providing the connection between the chain 10 and the chains 12. The short chains 13 connect with the chain 10 at points to one side of the tread of the tire, and consequently the zig-zag chain 10 is the only member of the device that is used to prevent skidding. The particular arrangement of this chain 10 however, materially improves the track properties of the wheel. A triangular shaped link 14 provides a connection between the short chains 13 and the tread chain 10. Carried by the lower end of each chain 13 is a spherical member 15 adapted to be received by the casting 16 secured to the side chains 12, the casting being provided with a substantially keyhole slot 17 to permit the spherical member 15 to be associated with the casting in a manner illustrated. By reason of this construction, the tread chain 10 can be separated from the side chains 12 at any time should the occasion require.

In carrying out the invention, I provide an improved fastening device for connecting the adjacent ends of each side chain 12, the fastener being designed to permit the ends of the chain to be quickly attached or detached and when attached to prevent casual separation of the same. The fastener comprises a plate-like member 18 which has an opening 19 in which one end of the chain 12 is fastened. The member 18 is wider at one end than at the other, and at the wide end is formed a pair of spaced hook-like members 20 each having a groove 21 to receive one of a pair of resilient locking elements 22, these elements being connected together in any suitable manner and mounted upon the member 18 for pivotal movement as at 23. The resilient elements 22 are shaped to provide shoulders 24 at a point adjacent their pivotal connection with the member 18, for a purpose to be presently described.

The co-operating member of the fastener consists of a bar 25 which has an opening 26 at one end to accommodate the other end of the side chain 12, to which the member 25 is secured. Projecting from the opposed sides of the bar 25 are lugs 27, these lugs being arranged in pairs as indicated.

In practice, the intermediate lugs 27 of the bar 25 are arranged within the hook-like members 20 of the plate 18, with the smallest pair of lugs reposing upon the shoulders 24 of the resilient locking elements 22, the latter mentioned lugs assisting in holding the locking elements 22 positioned within the grooves 21 of the hook-like elements 20. This provides a connection between the ends of the chain 12 which cannot become casually separated under any condition. The lugs 27 also provide for an adjustment of the fastener so that the chain may be lengthened or shortened as the occasion requires. For instance, if the last pair of lugs 27 were arranged within the hook-like members 20, the intermediate pair of lugs would be arranged to engage the shoulders 24 of the resilient fastening elements 22 for the purpose above stated. If on the other hand, the smallest pair of lugs 27 were positioned within the hook-like elements 20 to lengthen the chain 12, the locking elements 22 would remain in active position through their own inherent resiliency. The anti-skid device in its entirety is not only very efficient for the purpose intended, but the said device can be quickly applied to or removed from a wheel with little difficulty.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. An improved fastener of the character described comprising two members, spaced hook-like members arranged at the end of one member, spaced pairs of lugs carried by the other member and adapted to be interchangeably received by said hook-like members, and means carried by the first mentioned member for holding said lugs in said hooks.

2. An improved fastener of the character described comprising two members, spaced hooks arranged at the end of one of said members, spaced pairs of lugs carried by the other member, and adapted to be interchangeably received by said hooks, and resilient locking elements carried by the first mentioned member and adapted to embrace said hooks for holding the said members operatively associated.

3. A fastener of the character described comprising two members, spaced hooks arranged at the end of one of the said members, spaced pairs of lugs carried by the other member and adapted to be interchangeably received by said hooks, resilient locking members designed to engage said hooks to hold the members operatively associated, said locking elements being formed to provide shoulders adapted to be engaged by the lugs and arranged in advance of the lugs positioned in said hooks for the purpose specified.

In testimony whereof I affix my signature.

JOHN GRAY.